Patented July 9, 1929.

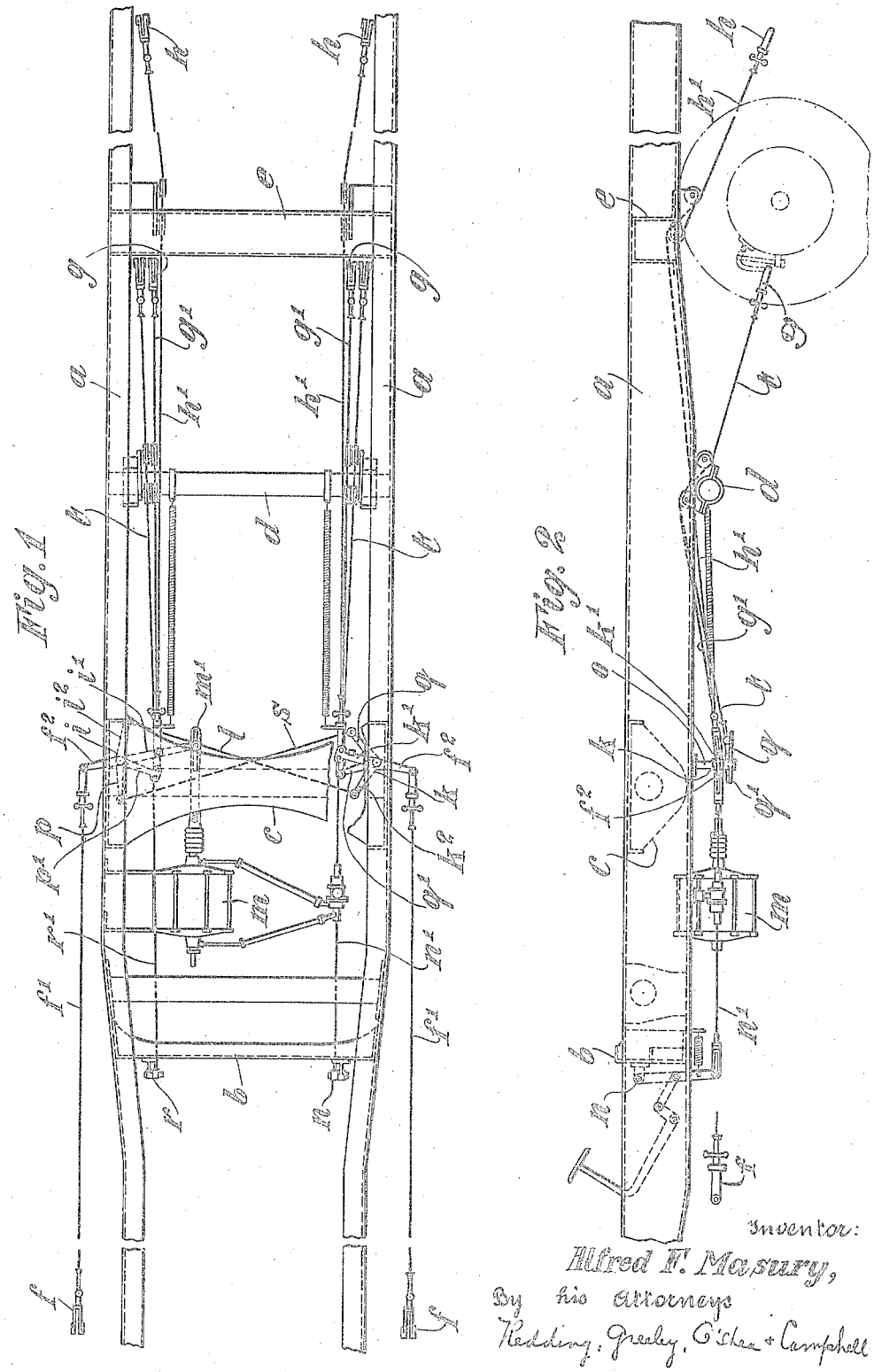

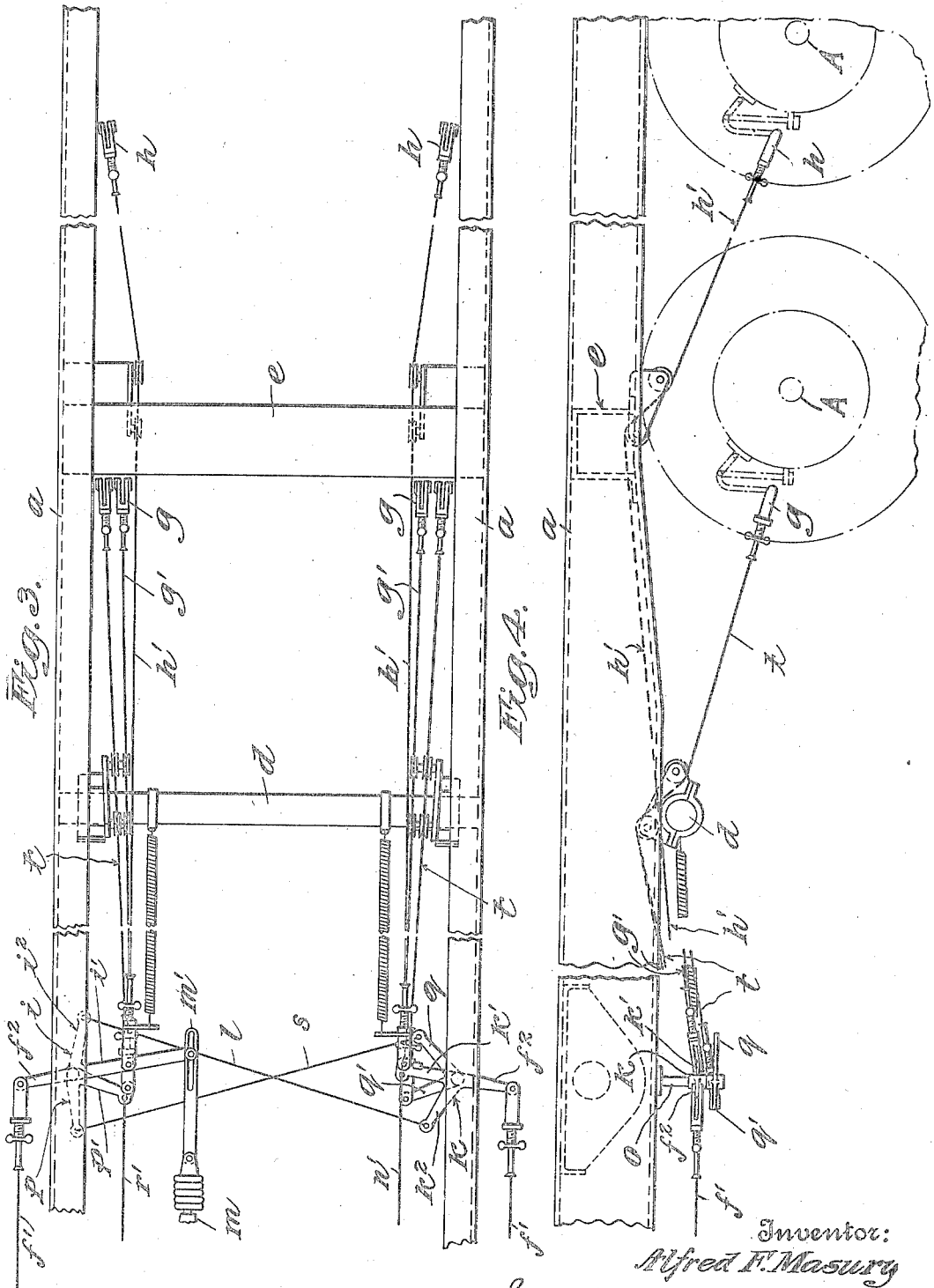

1,720,424

UNITED STATES PATENT OFFICE.

ALFRED F. MASURY, OF NEW YORK, N. Y., ASSIGNOR TO INTERNATIONAL MOTOR COMPANY, OF NEW YORK, N. Y., A CORPORATION OF DELAWARE.

BRAKE FOR FORWARD REAR AXLES OF SIX-WHEEL DRIVES.

Application filed March 31, 1928. Serial No. 266,140.

This invention relates to vehicle brakes and systems for operation thereof which are applicable to vehicles having six or more wheels. In such types, there are usually four driving wheels, each carrying a service brake operated from a common brake operating mechanism. Certain mechanical limitations in design restrict the universal flexibility between the four driving wheels considerably and permit free and independent movement of one wheel with respect to the others only through a limited range of spring action. It therefore happens that one pair of driving wheels in mounting a particularly high curb or other obstacle, lifts the other pair from the ground and spinning of the second pair consequently results due to the differential connection between the pairs. Under this condition, the vehicle cannot move and it has become necessary to overcome this situation.

The present invention provides a braking system, the efficacy of which equals that of existing braking systems, the system including a means for preventing spinning of the forward rear axle by applying an auxiliary brake to this axle without exerting any braking force on the other axle. As an emergency brake is required and used on all vehicles, it is proposed to apply this brake to the forward rear axle in order that it may serve the double function of preventing the forward rear axle from spinning under the above conditions, as well as anchoring the vehicle when it is at rest.

The invention will be understood more fully from the following description when read in connection with the accompanying drawings, wherein:

Figure 1 is a plan view, partly broken away, showing a vehicle frame provided with a braking system in accordance with the present invention.

Figure 2 is a view in side elevation showing the vehicle frame of Figure 1.

Figure 3 is a plan view, partly broken away, showing in detail the bell crank arms for operating the brakes.

Figure 4 is a side elevation of Figure 3.

In the above drawings, $a$ designates the side frame members provided with cross pieces $b$, $c$, $d$ and $e$. The driving axles are shown in Figure 4 at A—A. Connecting links $f$ are secured directly to the brakes of the front wheels to cause their application simultaneously with those of the brakes of the forward rear axle to which are connected connecting links $g$ and the brakes on the rearward rear axle to which are connected the links $h$. Connections $f'$ secure the links $f$ to arms $f^2$ of bell crank levers $i$ and $k$, the arms $i'$ and $k'$ of levers $i$ and $k$ being connected to links $g$ and $h$ by the respective connections $g'$ and $h'$, respectively. A cross tie $l$ is connected between arms $i^2$ and $k^2$ of the respective bell cranks $i$ and $k$, thus causing the bell cranks to move simultaneously. Arm $i'$ of bell crank $i$ is provided with an extension to which is connected the operating arm $m'$ of a vacuum booster brake $m$. The service brake shaft $n$ is connected to the crank $k$ through connection $n'$ and, in this manner, all of the brakes connected to the elements $f$, $g$ and $h$ are operated simultaneously to produce the desired braking effect.

Bell cranks $i$ and $k$ are mounted upon depending stub shafts $o$ which additionally carry bell cranks $p$ and $q$. Bell crank $p$ is operated by an emergency brake connection $r$ through a connecting element $r'$, and a cross tie $s$ causes the bell cranks $p$ and $q$ to move simultaneously. Connected to arms $p'$ and $q'$ of the respective bell cranks, are brake operating connections $t$ which extend to the emergency brake drums on the forward rear axle.

From the above, it will be seen that the emergency brakes on the forward rear axle are applied independently of the service brakes. If the forward rear axle is lifted from the ground and a spinning of the wheels thereof results, the wheels can be locked by proper application of the emergency brake system described above. The normal braking force applied to the wheels is not diminished and the above construction provides the added function of locking the forward rear wheels under the extreme conditions noted above.

No limitation is to be placed upon the invention described herein save as defined in the appended claims.

I claim as my invention:

1. A vehicle, a plurality of driving axles, carried therewith, means to exert a braking force on one of the axles, and independent means to exert a braking force on another axle.

2. A vehicle, a plurality of driving axles carried therewith, means to exert a braking force on the axles, separate braking means on one of the axles, and means to operate the separate braking means independently of the first braking means.

3. A vehicle, a pair of driving axles carried therewith, means to exert a braking force on the rearmost axle of the pair, and separate means to exert a braking force on the foremost of the pair.

This specification signed this 27th day of March, A. D. 1928.

ALFRED F. MASURY.